United States Patent [19]

Swanson

[11] 4,040,201

[45] Aug. 9, 1977

[54] MULTIDIRECTIONAL ANIMAL TRAP

[76] Inventor: Kenneth R. Swanson, Rte. No. 1, Waverly, Minn. 55390

[21] Appl. No.: 683,170

[22] Filed: May 4, 1976

[51] Int. Cl.² ........................................... A01M 23/26
[52] U.S. Cl. ........................................... 43/90; 43/92
[58] Field of Search .................. 43/85, 90, 91, 88, 77, 43/86, 92

[56] References Cited

U.S. PATENT DOCUMENTS

| 1,607,872 | 11/1926 | Cooper | 43/90 |
| 2,101,482 | 12/1937 | Tschantre | 43/90 |

Primary Examiner—Warner H. Camp
Attorney, Agent, or Firm—Wicks & Nemer

[57] ABSTRACT

A multidirectional animal trap including a base having a hub with spaced jaws pivotally mounted on the hub and extending radially therefrom. A U-shaped spring has one leg thereof secured to the hub with the other end having a ring formed thereon. A multiplicity of jaws, each having an offset portion in engagement with the ring and extending through the ring with the lower end of each offset portion pivotally mounted on the hub. Also provided is a pressure plate secured to a mount pivotally mounted on the base at the hub. An engagement bar is pivotally mounted on the base and formed with an extension portion that engages a slot formed in the mount of the pressure plate. The outer ends of the jaws are curved inwardly, whereby the same overlap which causes positive engagement with the animal trapped in a humane manner.

1 Claim, 7 Drawing Figures

MULTIDIRECTIONAL ANIMAL TRAP

SUMMARY

The invention relates to traps for small animals. It is an object of this invention to provide a trap having a multiplicity of jaws which clamp the body of the animal in a humane way and not the leg, for example, which the animal may well chew or tear off to get away. It is also an object of this invention to provide a trap which will trap an animal equally well no matter from which direction the animal approaches and contacts the trap. The jaws are spaced and radially extended from a central hub. The jaws are spread and set by depressing a spring connected to the hub. A bar is then releasably engaged in a pressure plate mount over one of the jaws. When pressure is applied to the pressure plate, it pivots and the bar is disengaged from the mount thereby allowing the spring to pivotally raise the jaws to clamping position.

The invention will appear more clearly from the following detailed description when taken in connection with the accompanying drawings, showing by way of example a preferred embodiment of the inventive idea wherein like numerals refer to like parts throughout.

In the drawings forming part of this application:

Figure 1:
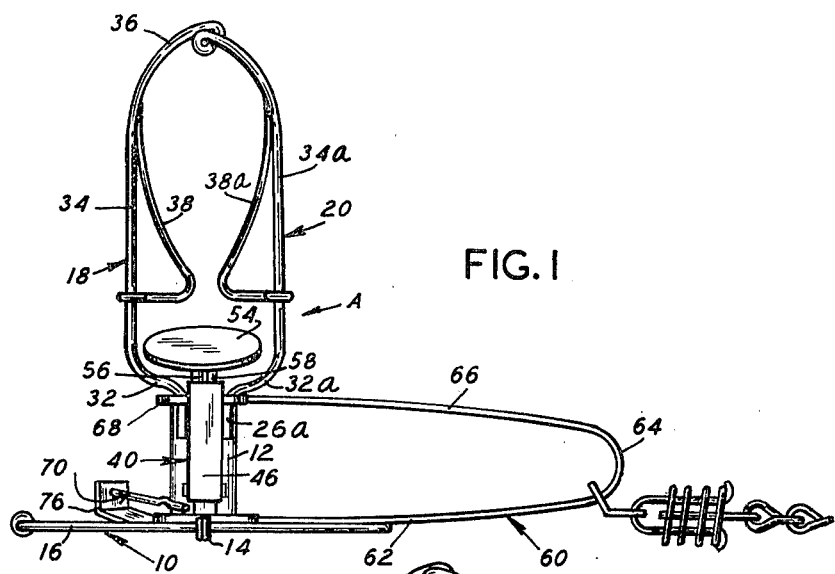
FIG. 1 is a side elevational view of a multidirectional animal trap in an unset condition embodying the invention.

Referring to the drawings in detail, the trap A includes the circular base 10 formed of the hub 12 from which emanates the spaced spokes 14. The spokes 14 are connected at the outer ends to the circular support ring 16. Further provided are the jaws 18,20,22 and 24 which are identical and therefore, only jaw 18 will be described in detail with identical parts in the other jaws bearing identical numbers but accompanied by lower case letters a,b, and c. The jaw 18 includes the relatively short straight vertical base end 26 pivotally mounted in the slot 28 of the hub 12 by means of the pin 30. The base end 26a of jaw 24 is pivotally mounted in the slot 27 in hub 12 by means of the pin 29. The base end 18 terminates in the outwardly flaring offset portion 32 which, in turn, terminates in the relatively straight upright portion 34. The jaw portion 34 terminates in the inwardly curved end portion 36. The curved ends of the jaws overlap when in clamping position. The jaw 18 is reinforced by the brace 38 connected at one end to the portion 36 and at the other end to the jaw portion 34.

The numeral 40 designates a pressure plate mount formed of a pair of spaced side walls 42 and 44 connected to a back wall 46. The lower ends of the walls 42 and 44 are pivotally connected by means of the pin 48 to the extension 50 secured to an extending from the hub 12. The side wall 42 is formed with the slot 52. Rigidly secured to and extending from the mount 40 is the circular pressure plate 54 by means of the pair of rods 56 and 58.

The numeral 60 designates a spring having the first leg 62 secured at the outer end to the hub 12. The inner end of the leg 62 terminates in the bight 64, which in turn terminates in the second leg 66 which overlies the first leg 62. The outer free end of the leg 66 terminates in the circular ring 68 through which extends the hub 12 and the base ends 26, 26a, 26b and 26c of the jaws 18, 20, 22 and 24. The ring 68 of the spring leg 66 urges upwardly against the offset portions 32, 32a, 32b and 32c of the jaws 18, 20, 22 and 24.

The numeral 70 designates an engagement bar which has formed on one end the stop 72. Intermediate the length of the bar 70 is the offset portion 74. Further provided is the upstanding mount 76 for the bar 70, and the mount has a hole 78 formed therethrough and through which the bar extends with the stop 72 up against the mount with the bar extending pivotally from the mount.

Figure 4:
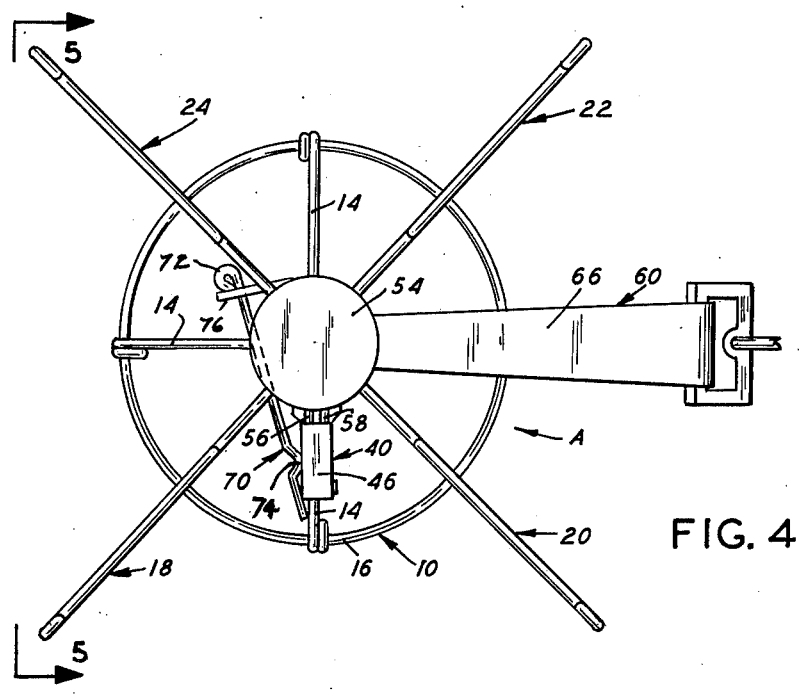
FIG. 4 is a top plan view of the trap in set condition.
Figure 7:
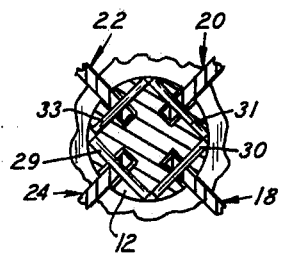
FIG. 7 is a sectional view on the line 7—7 of FIG. 6.
Figure 5:
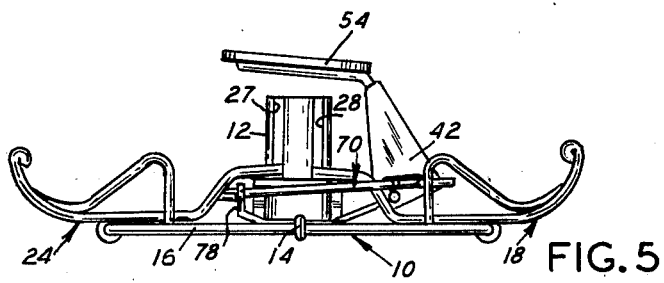
FIG. 5 is a front elevational view of the trap on the line 5—5 of FIG. 4.
Figure 6:
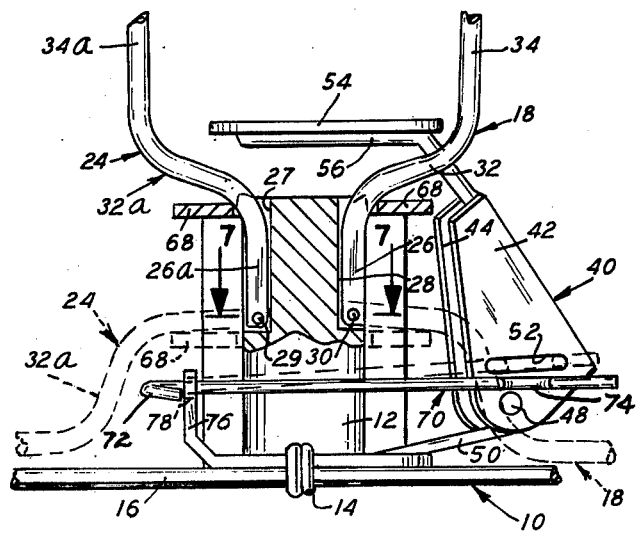
FIG. 6 is an enlarged view of the lower portion of the trap with the jaws shown in set position in broken lines.

The trap is set in the following manner:

The spring leg 66 is depressed whereby the ring 68 on the outer face end thereof is lowered relative to the hub 12 thereby allowing the jaws to pivot downwardly and separate into open "set" position as in FIGS. 4 and 5. The bar 70 is then moved so that it is positioned upon the jaw 18, and the offset portion 74 is engaged in the slot 52 of the pressure plate mount 40. As a result, the bar 70 holds the jaw 18 down which, in turn, holds the ring 68 and spring leg thereof down with the other jaws lying freely flat.

Figure 2:
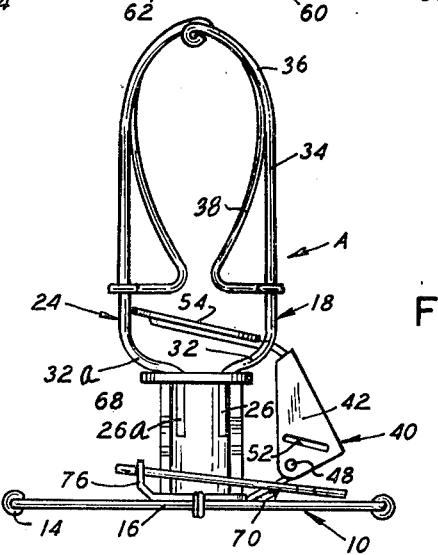
FIG. 2 is a front view thereof.
Figure 3:
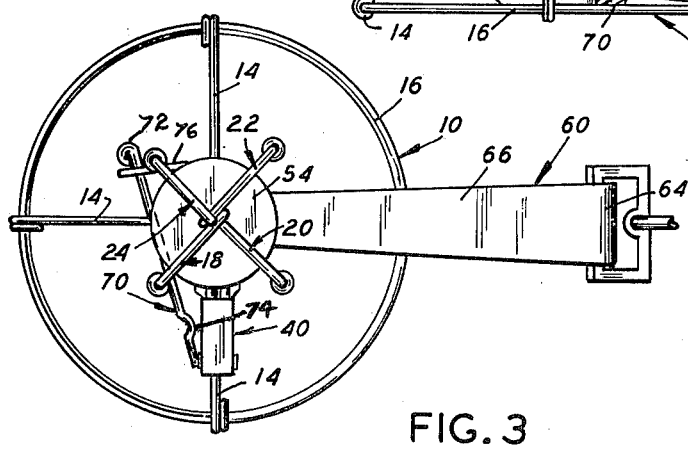
FIG. 3 is a top plan view.

When an animal presses the pressure plate pivotally and downwardly, the offset portion 74 is caused to release and be triggered from the slot 52, whereby the bar 70 no longer holds the jaw 18 and spring downwardly. The spring leg 66 is then forced to rise and the ring 68 thereon forces the jaws to pivot upwardly and together into clamping relationship as in FIGS. 1 and 2. It will be noted that the overlapping of the upper ends of the jaws tends to guarantee positive engagement with the animal trapped and the trap provides for humane grabbing of the body of the animal whereby a leg, e.g., is not grabbed and torn or chewed off by the animal. Further, it is also to be noted that the trap is multidirectional and allows entrances to the trap from any direction but still giving positive trap action.

Having thus described the invention, what is claimed as new and desired to be secured by Letters Patent is:

1. A multidirectional animal trap comprising:
   a. a base including a circular ring having
   b. spokes connected at the outer ends to the base ring and at the inner ends to
   c. an elongated cylindrical hub mounted axially of said ring on said base,
   d. at least three jaws pivotally mounted at the lower ends thereof in spaced slots formed in said hub and extending radially outwardly of the hub,
   e. a spring carried by said hub and in engagement with said jaws to normally hold the same together in closed clamping relation including a lower leg connected at the outer end of said base and terminating at its inner end in
   f. a bight which terminates in
   g. an upper leg overlying said lower leg with
   h. a ring formed on the outer free end of said upper leg through which said jaws extend and which urges said jaws into closed clamping condition,
   i. a pressure plate,
   j. means pivotally mounting said plate on said base,
   k. means for releasably holding said jaws in open separated condition against the action of said spring includig a bar pivotally mounted on said base for clamping engagement with one of said jaws with
l. means for releasable engagement with
m. the edge of an opening formed in said means mounting said pressure plate so that pressure applied to said plate causes disengagement of said engagement means of said bar from said opening whereby said jaws are caused to pivot to closed clamping relationship.

* * * * *